United States Patent [19]
Utsumi et al.

[11] Patent Number: 5,592,680
[45] Date of Patent: Jan. 7, 1997

[54] ABNORMAL PACKET PROCESSING SYSTEM

[75] Inventors: Teruo Utsumi; Shigeru Nagasawa; Masayuki Ikeda; Naoki Shinjo; Masami Dewa; Haruhiko Ueno; Kazushige Kobayakawa; Kenichi Ishizaka, all of Kawasaki, Japan

[73] Assignee: Fujitsu Limited, Kawasaki, Japan

[21] Appl. No.: 391,085

[22] Filed: Feb. 21, 1995

Related U.S. Application Data

[63] Continuation of Ser. No. 103,784, Aug. 10, 1993, abandoned.

[30] Foreign Application Priority Data

Dec. 18, 1992 [JP] Japan ................. 4-338793

[51] Int. Cl.⁶ .......................................... G06F 11/00
[52] U.S. Cl. ..................... 395/800; 395/850; 395/180
[58] Field of Search ........................... 395/800, 850, 395/180; 364/DIG. 1, DIG. 2

[56] References Cited

U.S. PATENT DOCUMENTS

| | | | |
|---|---|---|---|
| 3,873,819 | 3/1975 | Greenwald | 235/153 |
| 4,394,759 | 7/1983 | Delle Donne | 370/110.1 |
| 4,561,092 | 12/1985 | Shaver | 370/89 |
| 4,769,839 | 9/1988 | Preineder et al. | 370/86 |
| 4,803,683 | 2/1989 | Mori et al. | 371/19 |
| 4,933,940 | 6/1990 | Walter et al. | 371/9.1 |
| 4,953,096 | 8/1990 | Wachi et al. | 364/550 |
| 4,965,772 | 10/1990 | Daniel et al. | 364/900 |
| 5,081,626 | 1/1992 | Scott | 371/22.4 |
| 5,153,881 | 10/1992 | Bruckert et al. | 371/11.3 |
| 5,182,752 | 1/1993 | DeRoo et al. | 371/37.7 |

Primary Examiner—Thomas G. Black
Assistant Examiner—Valerie Darbe
Attorney, Agent, or Firm— Staas & Halsey

[57] ABSTRACT

This invention relates to an abnormal packet processing system, and is directed to minimize processing of an abnormal packet during communication between a plurality of processing units by a receiving processor. This data processing system includes a plurality of processing units connected through an interconnection. At least one of the processing units is a transmitting processor which includes a unit for detecting an abnormality of a data packet during transmission of the data packet to a receiving processor; and a unit for adding abnormality report data to the data packet being transmitted and sending the data packet with the abnormality report data to the receiving processor, or, in the alternate, inhibiting transmission of the abnormal packet.

3 Claims, 8 Drawing Sheets

ABNORMAL PACKET PROCESSING SYSTEM

This application is a continuation, of application Ser. No. 08/103,784, filed Aug. 10, 1993, now abandoned.

BACKGROUND OF THE INVENTION

1. Field of the Invention

This invention relates to an abnormal packet processing system. More particularly, it relates to an abnormal packet processing system in communications between processing units in a parallel computer system including I/O apparatuses and central processing units.

2. Description of the Related Art

When any abnormality occurs during packet communication between processing units of a data processing system employing an abnormal packet processing system according to the prior art, an instruction processing portion, in a transmitting processor, reports this abnormality to a receiving processor by allowing a packet, different from the packet under transmission, to contain control data and abnormality data and then transmitting it to the receiving processor.

According to the prior art in the system described above, the abnormal data packet has already been received at the point of time when the different packet containing the abnormality report data arrives at the receiving processor. As a result, there is the possibility that processing has been done on the abnormal packet. In other words, unnecessary processing is carried out on the abnormal packet.

SUMMARY OF THE INVENTION

It is therefore the main object of the present invention to provide an abnormal packet processing system which eliminates the necessity for processing an abnormal packet by a receiving processor when an abnormality occurs in a packet during transmission.

In a data processing system including a plurality of processing units connected through an interconnection which may be, for example, a network, the object of the present invention described above can be accomplished by an abnormal packet processing system wherein a transmitting processor includes an abnormality detection means for detecting any abnormality when such abnormality occurs during the transmission of a data packet from a transmitting processor to a receiving processor, and an abnormality report data addition means for adding abnormality report data indicating the occurrence of such abnormality and the classification of such abnormality to the data packet, during transmission to the receiving processor.

BRIEF DESCRIPTION OF THE DRAWINGS

The above and other objects and novel features of the present invention will become more apparent from the following description of the preferred embodiment when taken in connection with the accompanying drawings, wherein.

DESCRIPTION OF THE PREFERRED EMBODIMENTS

Prior to the description of the preferred embodiments of the present invention, the principle of the invention will be explained with reference to the associated drawings.

Figure 1:
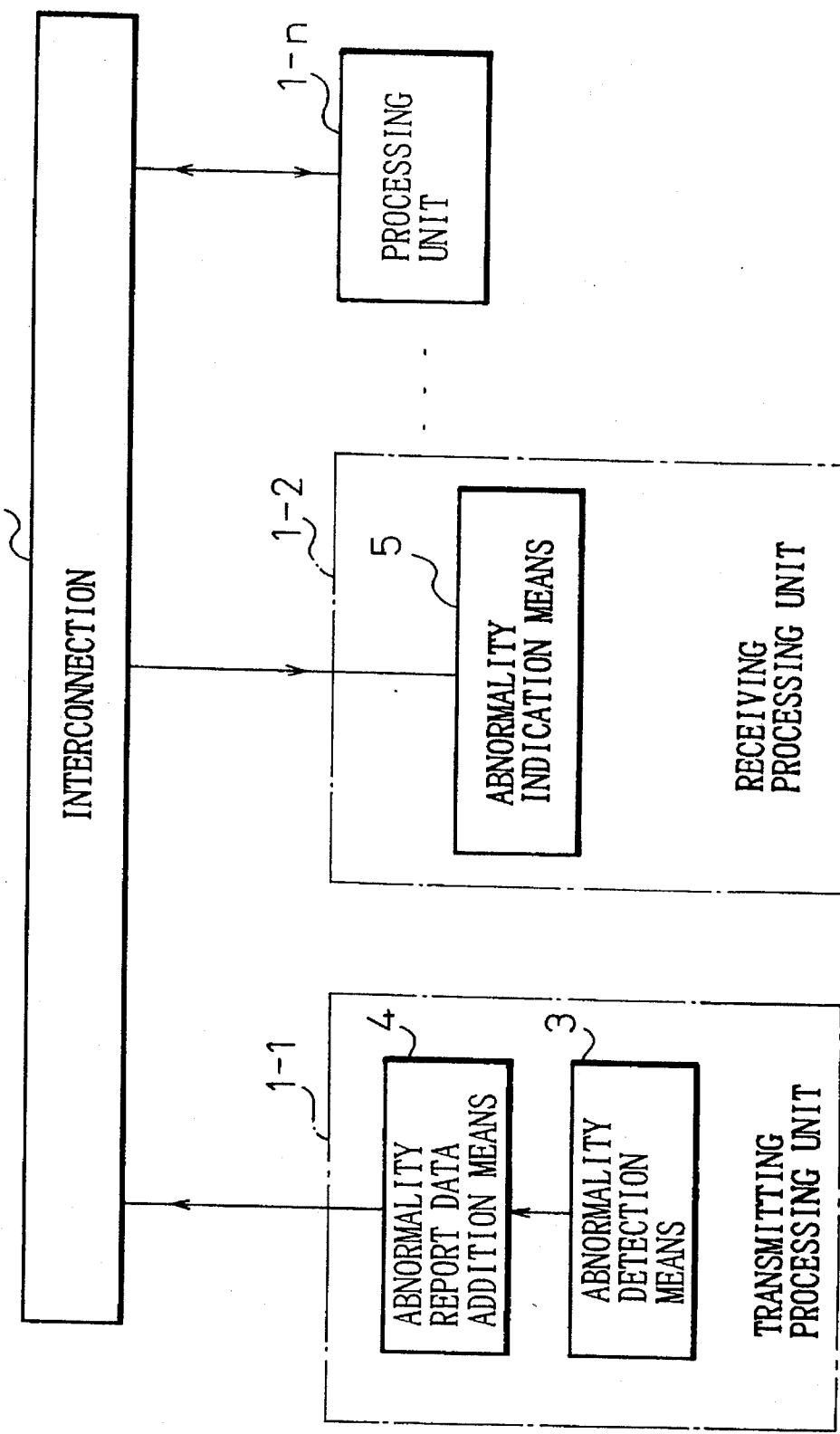
FIG. 1 is a block diagram useful for explaining the principle of a first embodiment of the present invention.

FIG. 1 is a block diagram useful for explaining the principle of one embodiment of the present invention. The drawing shows a data processor equipped with a plurality of processing units 1-1, 1-2, . . . , 1-n, and these processing units 1-1, 1-2, . . . , 1-n are connected with one another through an interconnection 2. According to the present invention, the transmitting processor 1-1 is equipped with an abnormality detection means 3 for detecting any abnormality when such abnormality occurs in a data packet which is being transmitted from the transmitting processor 1-1 to the receiving processor 1-2. Further, the transmitting processor 1-1 comprises an abnormality report data addition means 4 for adding abnormality report data to indicate the occurrence of this abnormality and its classification to the data packet during transmission, and for transmitting the data packet to the receiving processor 1-2.

The receiving processor 1-2 is equipped with an abnormality indication means 5 for holding displaying the received abnormality report data.

Figure 2:
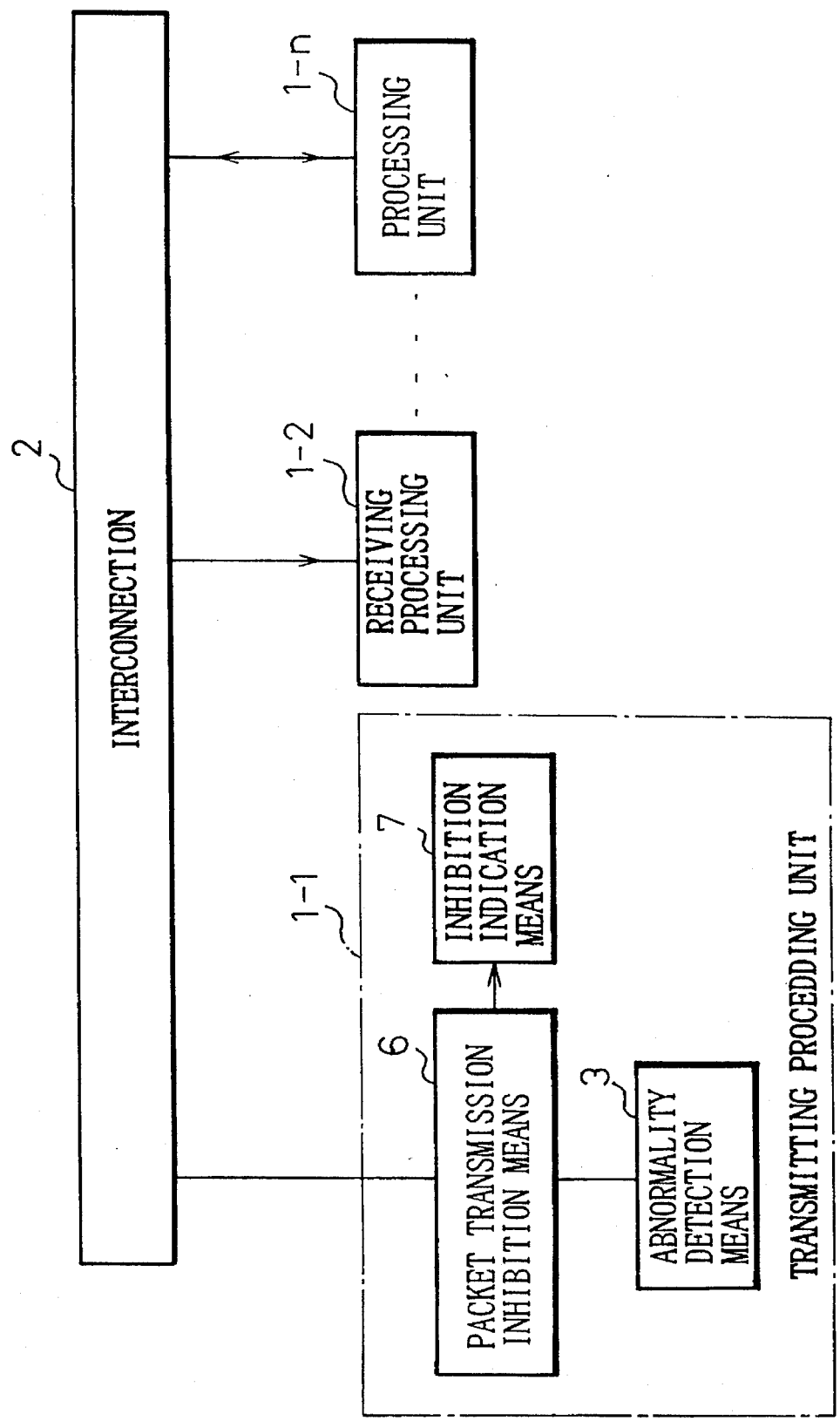
FIG. 2 is a block diagram useful for explaining the principle of a second embodiment of the present invention.

FIG. 2 is a block diagram useful for explaining the principle of a second embodiment of the present invention.

A plurality of processing units 1-1, 1-2, . . . , 1-n are shown connected through an interconnection 2 in FIG. 2 in the same way as in FIG. 1. According to this embodiment, the transmitting processor 1-1 is equipped with an abnormality detection means 3 for detecting any abnormality when such abnormality occurs in a data packet during transmission from the transmitting processor 1-1 to the receiving processor 1-2. The transmitting processor 1-1 is also equipped with a packet transmission inhibition means 6 for inhibiting the transmission of the data packet from the transmitting processor 1-1 when such abnormality is detected.

The transmitting processor 1-1 is equipped with an indication means 7 for indicating that transmission of the data packet is inhibited when the transmission of the data packet is inhibited.

According to the first embodiment of the invention shown in FIG. 1, the abnormality report data is added to the data packet during transmission and then the data packet is transmitted to the receiving processor 1-2. The receiving processor 1-2 displays the abnormality report data thus received. Accordingly, the report of the abnormal data arrives earlier at the reception processing unit and hence, abnormality processing becomes easier.

According to the second embodiment of the invention shown in FIG. 2, the transmission of the data packet from the transmitting processor 1-1 is inhibited when any abnormality occurs in the data packet during transmission from the transmitting processor 1-1 to the receiving processor 1-2. Accordingly, the processing of abnormal data does not occur or in the receiving processor.

Figure 3:
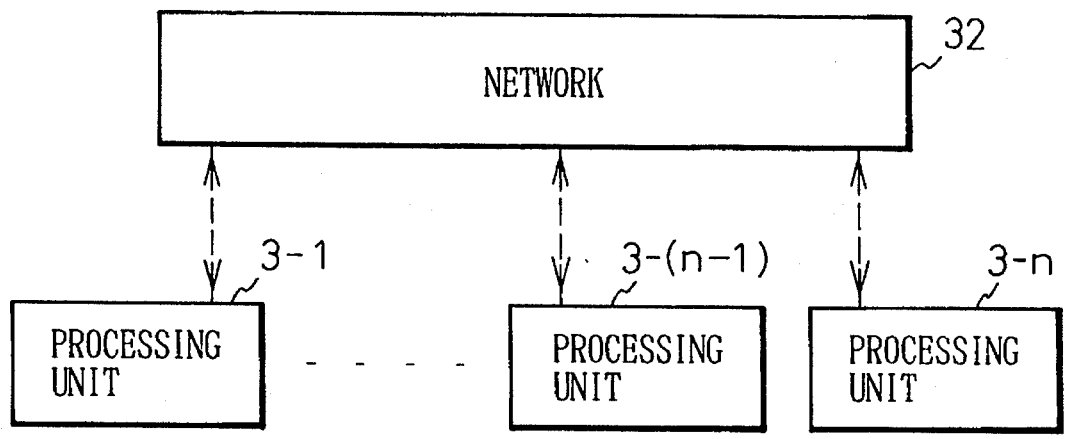
FIG. 3 is a block diagram showing the construction of a data processing system applied to an embodiment of the present invention.

FIG. 3 is a block diagram showing a data processing system to which the abnormal packet processing system according to the embodiment of the present invention is applied. In the drawing, a plurality of processing units 3-1 to 3-n are shown connected through a network 32. These processing units are, for example, vector operation circuits or scalar operations circuits of a parallel computer system, and constitute a multi-processor.

The network 32 may be either a switching network having a switching function, or a bus.

A packet is transmitted from one of the processing units to others. When any abnormality occurs in this packet during transmission, this abnormality is reported to the processing unit on the receiving side, or the transmission of the packet itself is inhibited by the transmitting processor, by the means of the embodiments of the present invention which will be described next.

Figure 4:
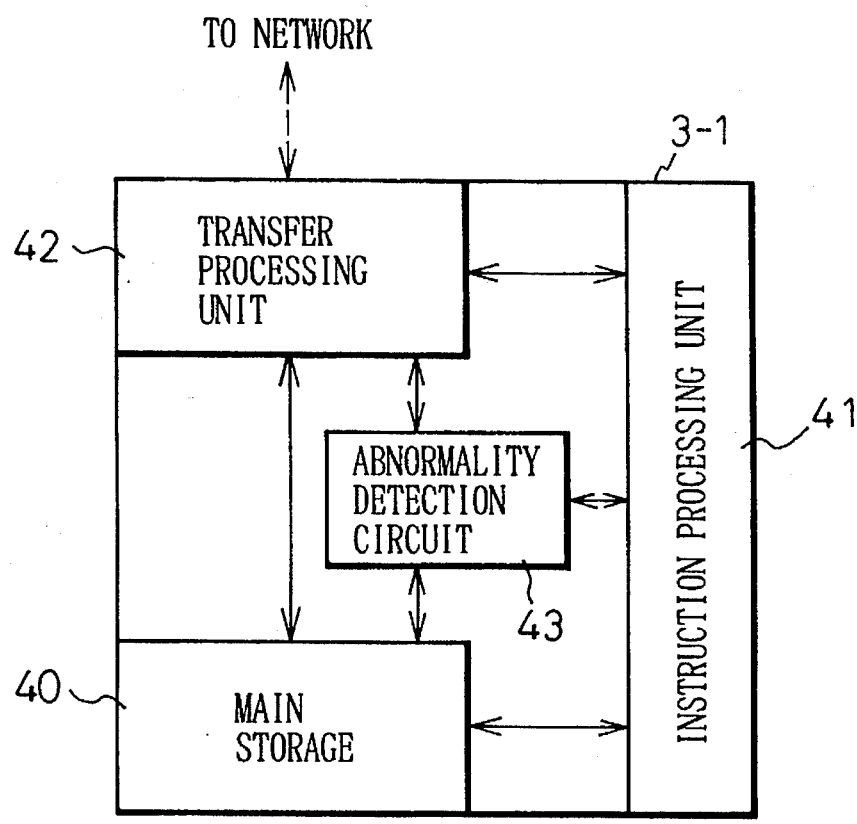
FIG. 4 is a block diagram showing a first construction of a processing unit according to a first embodiment of the present invention.

FIG. 4 is a block diagram showing one construction of the processing unit according to the embodiment of the present invention. In this construction, the processing unit 3-1 includes a main storage 40 for storing instructions (that is, a program) and data; an instruction processing unit 41 for retrieving the instructions from the main storage 40 and executing them; a transfer processing unit 42 to transfer a packet between the main storage 40 and a network 32; and an abnormality detection circuit 43 for detecting the occurrence of any abnormality when such abnormality occurs in any of the main storage 40, the instruction processing unit 41 and the transfer processing unit 42 during transmission of the packet.

Figure 5:
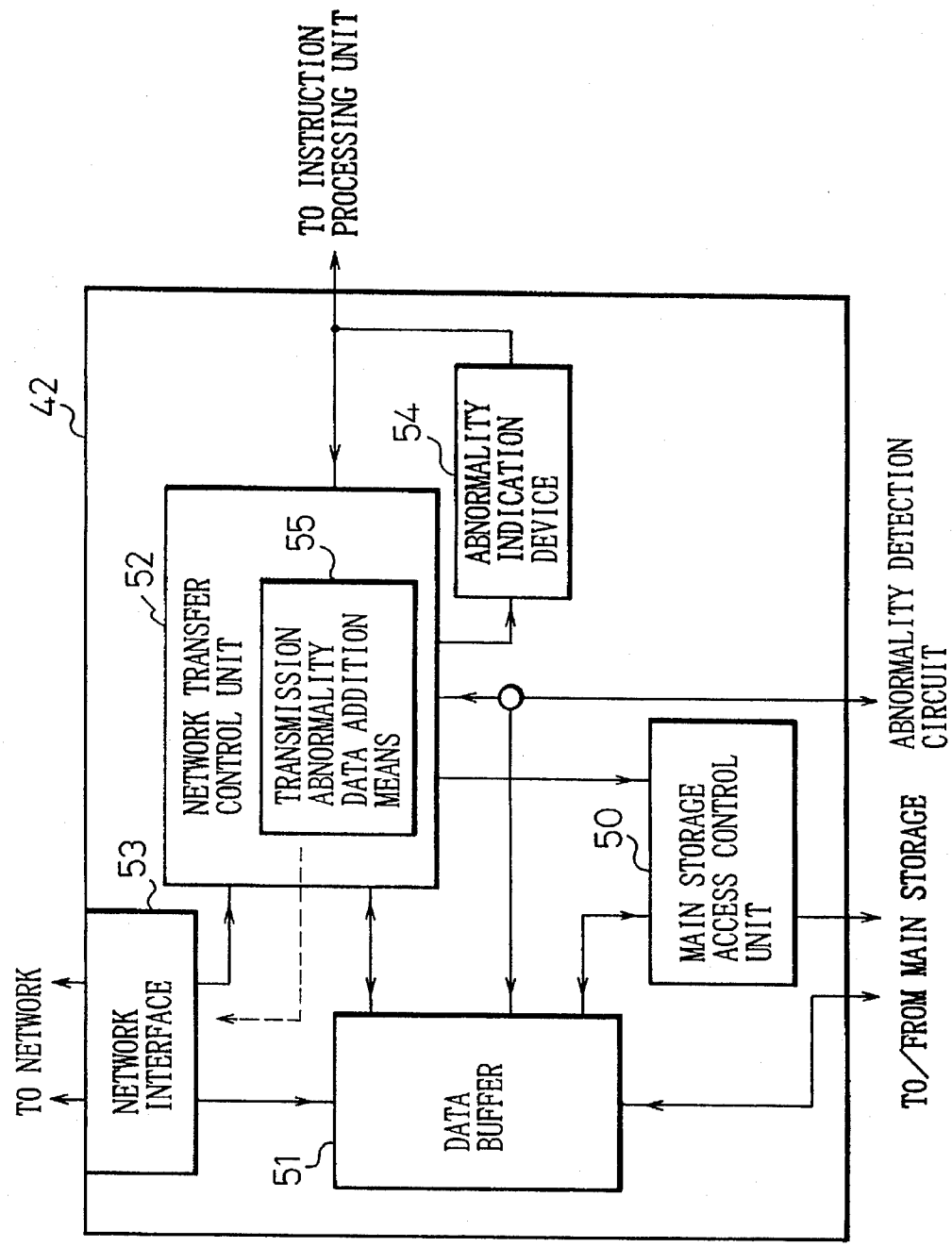
FIG. 5 is a block diagram showing a construction of a transfer processing unit in a first embodiment of the present invention.

FIG. 5 is a block diagram showing the construction of the transfer processing unit 42 in the embodiment of the present invention. In this construction, the transfer processing unit 42 includes a main storage access control unit 50 for controlling access to the main storage 40; a data buffer 51 for storing the data read out from the main storage 40 and accumulating the data to be stored in the main storage 40 under the control of the main storage access control unit 50; a network transfer control unit 52; a network interface 53 and an abnormality indication device 54 for indicating that an abnormality exists in the received packet.

Figure 6:
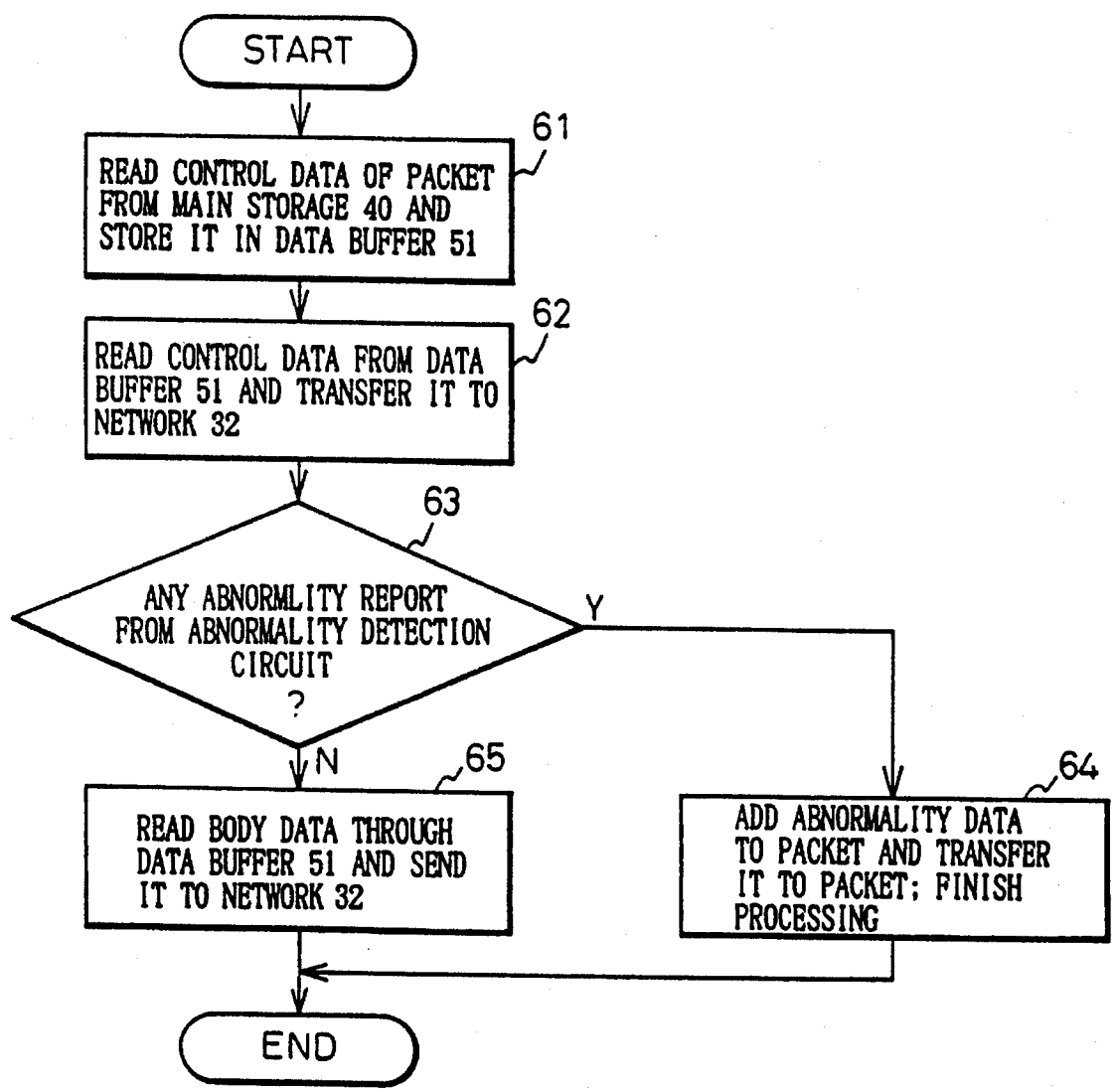
FIG. 6 is a flowchart useful for explaining the operation of the transfer processing unit shown in FIG. 5.

FIG. 6 is a flowchart useful for explaining the operation of the transfer processing unit 42 shown in FIG. 5.

Figure 7:
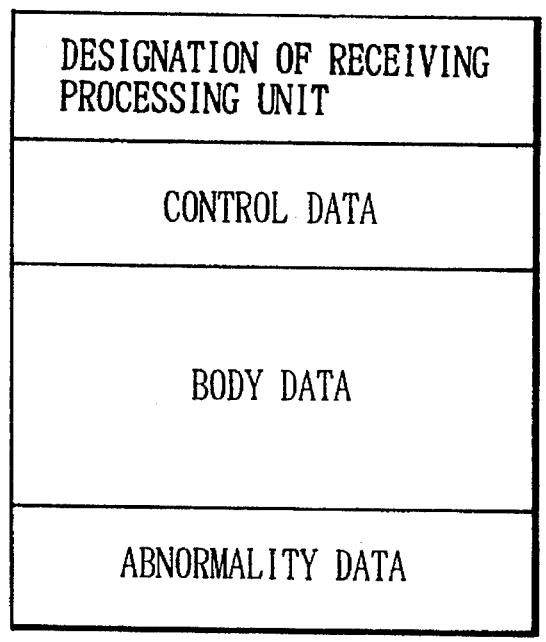
FIG. 7 is a diagram showing the construction of a packet according to a first embodiment of the present invention.

FIG. 7 is a diagram showing the construction of the packet according to the embodiment of the present invention. As shown in FIG. 7, the packet comprises address data for designating a receiving processor, other control data and abnormality data which is added in accordance with the present invention. The control data includes memory access attributes in the transmitting processor, data relating to designation of the processing in the receiving processor, and so forth.

Figure 8:
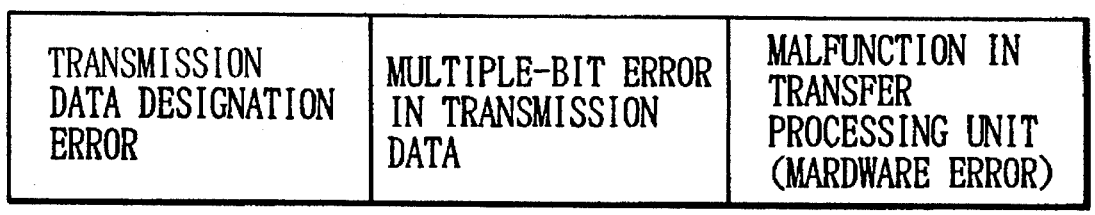
FIG. 8 is a diagram showing the content displayed on a display according to a first embodiment of the present invention.

FIG. 8 shows the content of the abnormality data held by the indication device inside the processing unit on the receiving side or the transmitting side according to the present invention. As shown in FIG. 8, the indication device indicates that the transmission data is designated incorrectly, indicates that a multiple-bit error occurred in the transmission data, or indicates that hardware errors occurred inside the transfer processing unit.

The operation of the embodiment of the present invention will be explained with reference to FIGS. 3 to 6.

The main storage access control unit 50 accesses the main storage 40 under instruction from the network transfer control unit 52, and controls the transfer of data between the main storage 40 and the data buffer 51. The data buffer 51 temporarily stores the data when data transfer is carried out between the main storage 40 and the network 32, and also temporarily stores the data when a data write request is made by the data transfer unit 42 and by the main storage access control unit 50 to the main storage 40.

The network transfer control unit 52 inside the transfer processing unit 42 is activated by the control data in the transfer packet generated by the instruction processing unit 41, and issues a main storage access request to the main storage access control unit 50 so as to read out the control data from the transfer packet. The data is read out from the main storage 40 in response to this access request, and is stored in the buffer 51 (Step 61 in FIG. 6). The network transfer control unit 52 controls the network interface 53, and sends the control data from the data buffer 51 to the network 32 (Step 62 in FIG. 6). When any abnormality occurs in the main storage 40, the instruction processing unit 41 or the transfer processing unit 42 during the transfer of the control data from the transfer processing unit 42 (in the case of Y at Step 63 in FIG. 6), the abnormality detection circuit 43 detects this abnormality and reports it to the network transfer control unit 52. Upon receiving this report, the transmission abnormality data addition device 55 inside the network control unit 52 adds the abnormality data to the data packet during the transmission (Step 64 in FIG. 6).

When no abnormality is detected, the data from the data buffer 51 is delivered to the network 32 (Step 65 in FIG. 6).

Upon receiving the packet having the abnormality data added thereto, the processing unit on the receiving side allows the abnormality indication device 54 to hold details of the abnormality. The abnormality indication device 54 is a register to which reference can be made from the instruction processing unit. This abnormality can also be held in the abnormality indication device 54 on the transmitting side.

Figure 9:
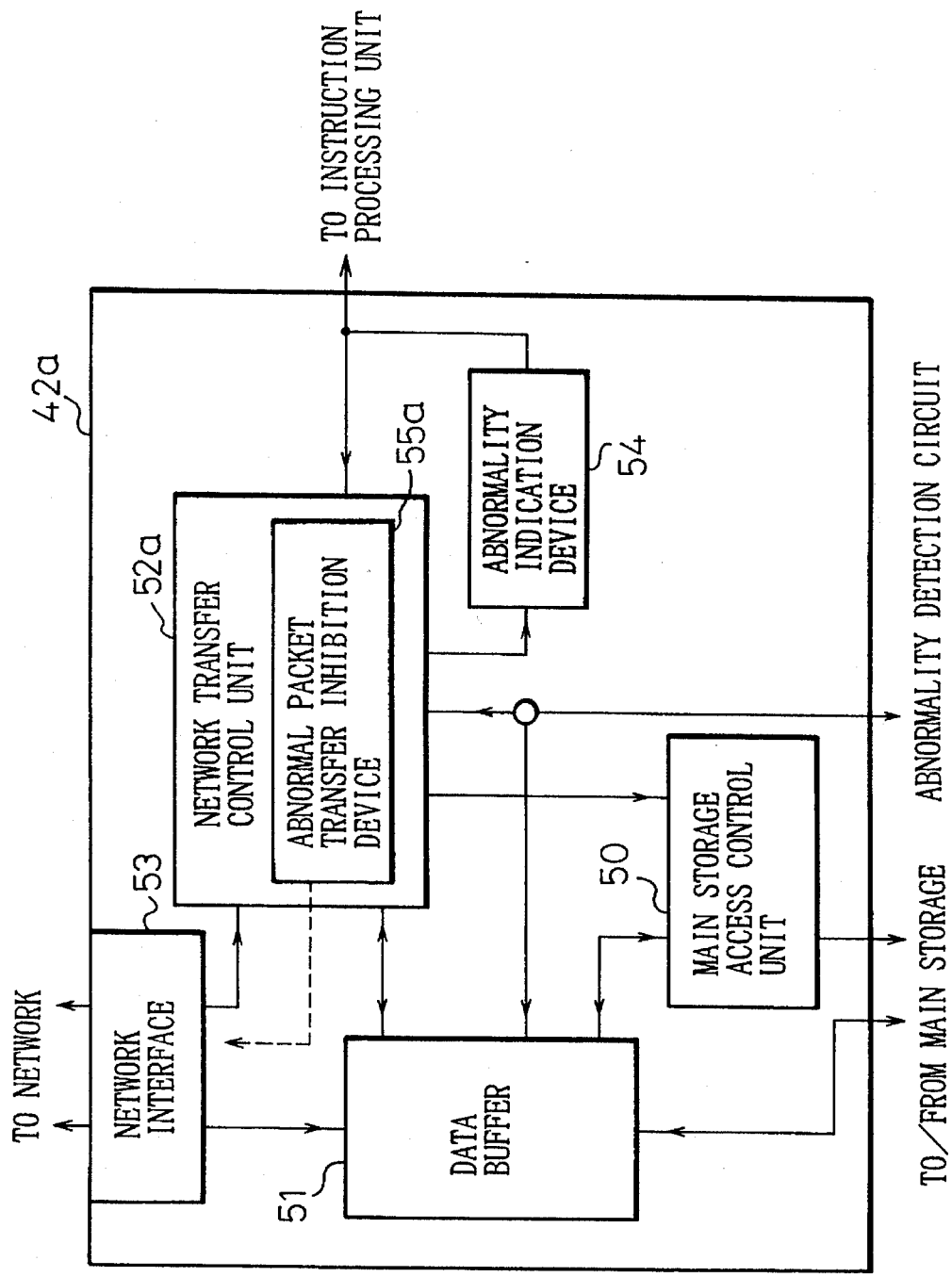
FIG. 9 is a block diagram showing the construction of a transfer processing unit according to a second embodiment of the present invention.

FIG. 9 is a block diagram showing the construction of the transfer processing unit according to another embodiment of the present invention. The same reference numerals will be used in this drawing to represent the same circuit elements as in FIG. 5 and a suffix a will be added to the reference numeral to represent a modified circuit element which is analogous to one shown in FIG. 5.

In FIG. 9, delivery of the normal data packet is carried out in the same way as in FIG. 5. When any abnormality occurs in the main storage 40, the instruction processing unit 41 or the transfer processing unit 42a during the transfer of the data packet, the abnormality detection circuit 43 detects this abnormality and reports it to the network transfer control unit 52a. Upon receiving this report, the abnormality packet transfer inhibition device 55a inside the network transfer control unit 52a inhibits the transmission of the abnormal data packet.

The abnormality indication device 54 inside the processing unit on the transmission side indicates the inhibition of the transmission of the packet as well as the content of this abnormality.

Figure 10:
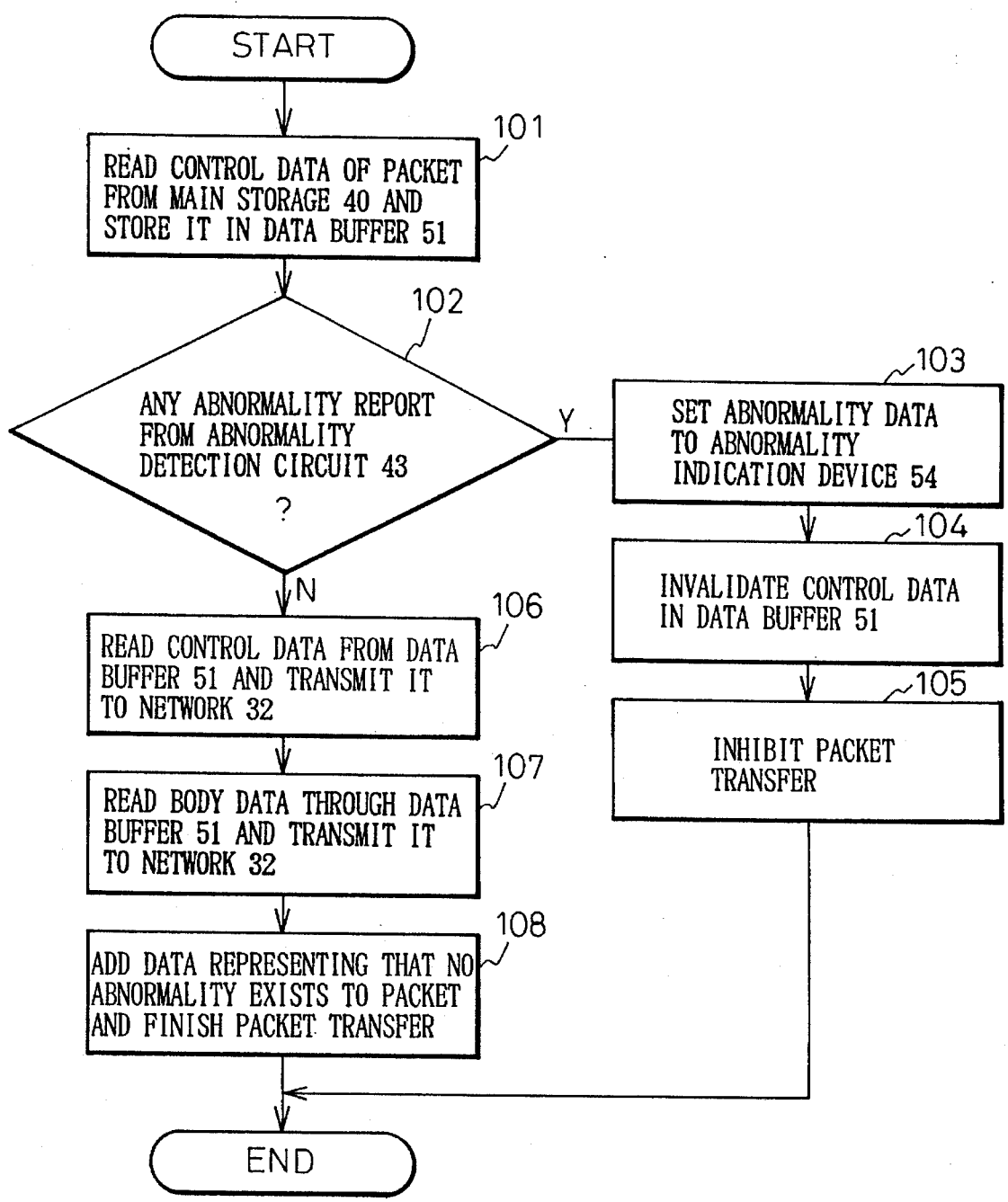
FIG. 10 is a flowchart useful for explaining the operation of the transfer processing unit shown in FIG. 9.

FIG. 10 is a flowchart useful for explaining the operation of the transfer processing unit 42a shown in FIG. 9. In this drawing, the control data of the packet is first read out from the main storage 40 at Step 101 in the same way as in FIG. 6, and is stored in the data buffer 51. When the abnormality report from the abnormality detection circuit 43 arrives during the storage of this control data (in the case of Y at Step 102), the abnormality data is sent to the abnormality indication device 54 at Step 103, the control data in the data buffer 51 is made invalid at Step and the packet transfer is inhibited at Step 105.

When the abnormality report does not exist at Step 102, the control data is read out from the data buffer 51 at Step 106 and is sent to the network 32. The data is then read out from the data buffer 51 at Step 107 and is sent to the network 32. After the data representing that no abnormality exists is added to the packet at Step 108, the packet transfer is completed.

Examples of abnormality referred to in FIGS. 5 and 9 are multiple-bit errors in the main storage 40 and hardware errors inside the transfer processing unit.

Although the foregoing embodiments illustrate the case where the transmission abnormality data addition device and the abnormal packet transfer inhibition device are constituted by the hardware, they may also be accomplished by software.

As can be clearly understood from the explanation given above, one of the embodiments of the present invention adds the abnormality report data to the data packet when any abnormality exists on the transmission side during the data transfer between the processing units of the data processing system. For this reason, transfer of another packet for notifying this abnormality to the reception processing unit becomes unnecessary, and the abnormality report arrives up in the receiving processing unit, so that the abnormality processing becomes more simple. According to another embodiment of the present invention, the transmission of the data packet itself is inhibited when any abnormality exists on the transmission side. Accordingly, processing to cope with abnormality becomes unnecessary at the receiving processing unit.

We claim:

1. An abnormal packet processing system in a data processing system comprising:

a network;

a receiving processor for receiving data in data packets from said network said receiving processor comprises abnormality indication means for analyzing abnormality report data of each received data packet and for indicating whether a malfunction exists in each respective received data packet; and a transmitting processor for transmitting data in data packets, through said network, said transmitting processor comprising:

first means for detecting malfunctions which occur during transmission of each data packet from said transmitting processor; and second means, coupled to said first means, for adding to each data packet, during transmission and in response to said first means, abnormality report data containing an indication that at least one of said malfunctions has occurred and a classification of each of the malfunctions which has occurred.

2. An abnormal packet processing system in a data processing system for a network to which a plurality of processing units are couple, at least one processing unit of said plurality of processing units comprising:

a main storage for storing instructions and data included in data packets;

a transfer processing unit to transfer said data packets between said main storage and the network;

an instruction processing unit for retrieving the instructions from said main storage, executing the instructions, and controlling said transfer processing unit; and a malfunction detection circuit for detecting malfunctions when at least one of said malfunctions occurs in at least one of said main storage, said instruction processing unit and said transfer processing unit during transfer of a data packet and outputting an indication thereof wherein said transfer processing unit further comprises:

a main storage access control unit for controlling access to said main storage;

a data buffer for storing data read out from said main storage and accumulating data to be stored in said main storage under control of said main storage access control unit;

a network interface for interfacing said data buffer and said network; and a network transfer control unit for controlling said main storage access control unit, said data buffer and said network interface, said network transfer control unit including a transmitting malfunction data addition device for adding malfunction data to a data packet being transferred in response to said malfunction detection circuit.

3. An abnormal packet processing system according to claim 2, wherein said transfer processing unit comprises an abnormality indication device for analyzing the output of said malfunction detection circuit for each respective data packet and providing an indication if a malfunction exists in a data packet.

* * * * *

UNITED STATES PATENT AND TRADEMARK OFFICE
CERTIFICATE OF CORRECTION

PATENT NO. : 5,592,680

DATED : January 7, 1997

INVENTOR(S) : Teruo UTSUMI, et al.

It is certified that error appears in the above-indentified patent and that said Letters Patent is hereby corrected as shown below:

Title Page, Section [56], Column 2, before "Primary Examiner", insert -- FOREIGN DOCUMENTS -- and -- WO 84/04862 12/84 WIPO --.

Column 2, line 44, after "holding", insert -- and --.

Column 4, line 51, change the second occurrence of "a" to -- $\underline{a}$ --.

Column 5, line 10, after "step", insert -- 104, --.

Column 5, line 12, change "102," to -- 102 (the case of N), --.

Column 6, line 15, change "couple" to -- coupled --.

Signed and Sealed this

First Day of July, 1997

Attest:

BRUCE LEHMAN

*Attesting Officer*  *Commissioner of Patents and Trademarks*